(12) United States Patent
Elliot et al.

(10) Patent No.: US 11,678,005 B2
(45) Date of Patent: *Jun. 13, 2023

(54) LATENCY NEGOTIATION IN A HETEROGENEOUS NETWORK OF SYNCHRONIZED SPEAKERS

(71) Applicant: Bose Corporation, Framingham, MA (US)

(72) Inventors: Michael William Elliot, Grafton, MA (US); Debasmit Banerjee, Everett, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/135,746

(22) Filed: Dec. 28, 2020

(65) Prior Publication Data

US 2021/0120302 A1    Apr. 22, 2021

Related U.S. Application Data

(63) Continuation of application No. 16/269,035, filed on Feb. 6, 2019, now Pat. No. 10,880,594.

(51) Int. Cl.
| | |
|---|---|
| *H04L 1/00* | (2006.01) |
| *H04N 21/43* | (2011.01) |
| *H04B 17/364* | (2015.01) |
| *H04L 12/40* | (2006.01) |
| *H04L 43/0852* | (2022.01) |

(Continued)

(52) U.S. Cl.
CPC ....... *H04N 21/4305* (2013.01); *H04B 17/364* (2015.01); *H04L 1/0018* (2013.01); *H04L 12/40117* (2013.01); *H04L 43/0858* (2013.01); *H04L 43/0888* (2013.01); *H04L 43/16* (2013.01); *H04N 21/439* (2013.01); *H04N 21/43076* (2020.08); *H04R 3/12* (2013.01); *H04S 7/308* (2013.01); *H04W 28/0215* (2013.01); *H04W 56/001* (2013.01); *H04W 56/004* (2013.01); *H04L 45/02* (2013.01)

(58) Field of Classification Search
CPC ..... H04L 65/00; H04L 51/10; H04L 12/2805; H04L 1/0018; H04L 45/02; H04L 12/2416

See application file for complete search history.

(56) References Cited

U.S. PATENT DOCUMENTS

| | | | |
|---|---|---|---|
| 10,880,594 B2 * | 12/2020 | Elliot | H04L 43/16 |
| 2004/0100942 A1 * | 5/2004 | Blank | H04L 69/169 |
| | | | 370/352 |

(Continued)

*Primary Examiner* — Salvador E Rivas

(57) ABSTRACT

A method is provided that can be performed by an audio source for negotiating latency in an audio network. The audio source receives information regarding an audio processing latency associated with each of a set of two or more audio output devices connected to the audio network. The audio source determines, based at least on the received information, a maximum delay for outputting audio samples streamed by the audio source from the audio output devices in the set. The audio source determines, based on the maximum delay, timing for outputting the audio samples from the audio output devices in the set. The audio source then communicates the determined timing to the set of audio output devices for processing the audio samples in accordance with the timing.

20 Claims, 5 Drawing Sheets

(51) Int. Cl.
*H04L 43/0888* (2022.01)
*H04L 43/16* (2022.01)
*H04N 21/439* (2011.01)
*H04R 3/12* (2006.01)
*H04S 7/00* (2006.01)
*H04W 28/02* (2009.01)
*H04W 56/00* (2009.01)
*H04L 45/02* (2022.01)

(56) References Cited

U.S. PATENT DOCUMENTS

| | | | | |
|---|---|---|---|---|
| 2009/0060446 | A1* | 3/2009 | Holden | H04N 21/4135 |
| | | | | 386/356 |
| 2010/0235486 | A1* | 9/2010 | White | H04N 21/233 |
| | | | | 709/248 |
| 2010/0295993 | A1* | 11/2010 | Oh | H04N 21/43637 |
| | | | | 348/E5.011 |
| 2013/0340014 | A1* | 12/2013 | Evans | H04S 3/008 |
| | | | | 725/74 |
| 2016/0050508 | A1* | 2/2016 | Redmann | H04S 7/302 |
| | | | | 381/303 |
| 2021/0337250 | A1* | 10/2021 | Huang | H04N 21/23106 |

* cited by examiner

LATENCY NEGOTIATION IN A HETEROGENEOUS NETWORK OF SYNCHRONIZED SPEAKERS

RELATED APPLICATIONS

This application is a continuation application of U.S. patent application Ser. No. 16/269,035, filed on Feb. 6, 2019, which is hereby incorporated by reference in its entirety.

FIELD

Aspects of the disclosure generally relate to synchronized audio output from multiple speakers, and more specifically to techniques for negotiating latency in a heterogeneous network of synchronized speakers.

BACKGROUND

Audio output devices such as audio speakers are available in several hardware configurations and can use a range of technologies for processing and rendering audio streams and for communicating with other devices, including audio input devices and other audio speakers. For example, speakers range from Bluetooth® speakers, Wi-Fi™ speakers, Audio for Video speakers (e.g., sound bars) and speakers that use other communication protocols. The wide array of speaker architectures, configurable speaker network topologies and communication technologies (e.g., Bluetooth, Wi-Fi etc.) used by the speakers to communicate with other devices makes interoperation and synchronization between speaker devices complicated and difficult to coordinate and execute.

SUMMARY

All examples and features mentioned herein can be combined in any technically possible manner.

Aspects of the present disclosure provide a method performed by an audio source for negotiating latency in an audio network. The method generally includes receiving information regarding an audio processing latency associated with each of a set of two or more audio output devices connected to the audio network; determining, based at least on the received information, a maximum delay for outputting audio samples streamed by the audio source from the audio output devices in the set; determining, based on the maximum delay, timing for outputting the audio samples from the audio output devices in the set; and communicating the determined timing to the set of audio output devices for processing the audio samples in accordance with the timing.

In an aspect, the maximum delay includes a maximum time taken for an audio sample from the time the audio sample is output by the audio source to the time the audio sample is output by an audio transducer of an output device from the set.

In an aspect, the timing for outputting the audio samples includes a time, with reference to a reference clock, to output an audio sample from the output devices, wherein all output devices are time synchronized.

In an aspect, determining the maximum delay includes determining the maximum delay further based on a distribution latency to each audio output device from the set.

In an aspect, the distribution latency to an audio output device from the set is a function of a communication technology used for communication with the audio output device.

In an aspect, the audio source further communicates with a first subset of audio output devices from the set using a first communication technology and communicates with a second subset of audio output devices from the set using a second communication technology different from the first communication technology.

In an aspect, the audio source further obtains information regarding whether an audio output device from the set is configured for in-room operation or out-of-room operation.

In an aspect, the audio source further determines, based on the obtained information, that the audio output device is configured for in-room operation, wherein the audio output device outputs the audio samples in accordance with the timing, for output of the audio samples synchronized with output of the audio samples by other audio output devices from the set also configured for in-room operation.

In an aspect, the audio source further determines, based on the obtained information, that the audio output device is configured for out-of-room operation, wherein the audio output device, in order to achieve a best audio experience criterion, allows output of the audio samples with a phase shift from the audio samples output by one or more other audio output devices from the set configured for in-room operation.

In an aspect, the audio source further detects a change in configuration of the audio network, adjusts the timing for outputting audio samples from one or more of the audio output devices, based on the changed configuration, and communicates the adjusted timing to the audio output devices.

In an aspect, the audio source further determines that a communication technology used for a connection with at least one of the audio output devices is Wi-Fi technology, and buffers a portion of an audio stream before starting to transmit to the at least one device, wherein an amount of the buffered portion is based on the determined timing for outputting audio samples from the audio output devices in the set.

In an aspect, the audio source further communicates an indication of the determined timing to a video output device configured to output video synchronized with the audio output from at least one of the audio output devices from the set, and instructs the video output device to delay outputting the video to synchronize with the audio.

In an aspect, the audio source further decides to implement a lowest latency audio experience or a best audio experience based on a type of an input audio stream.

Aspects of the present disclosure provide an audio network. The audio network generally includes an audio source in communication with the audio output devices and configured to transmit a stream of audio samples for outputting by the audio output devices in the set. The audio source is generally configured to receive information regarding an audio processing latency associated with each of the set of audio output devices; determine, based at least on the received information, a maximum delay for outputting audio samples from the audio output devices in the set; determine, based on the maximum delay, timing for outputting the audio samples from the audio output devices in the set; and communicate the determined timing to the set of audio output devices for outputting the audio samples in accordance with the timing.

In an aspect, at least one audio output device in the set processes the audio samples based on the received timing, for synchronized output with at least one other audio output device in the set.

In an aspect, the maximum delay comprises a maximum time taken for an audio sample from the time the audio sample is output by the audio source to the time the audio sample is output by an audio transducer of an audio output device from the set.

In an aspect, the timing for outputting the audio samples comprises a time, with reference to a reference clock, to output each audio sample from the output devices, wherein all output devices are time synchronized.

Aspects of the present disclosure provide an audio source for negotiating latency in an audio network. The audio source generally includes at least one processor and a memory coupled to the at least one processor. The at least one processor is generally configured to receive information regarding an audio processing latency associated with each of a set of two or more audio output devices connected to the audio network; obtaining information regarding a distribution latency to each audio output device in the set; determine, based at least on the received information regarding the audio processing latency and the distribution latency, a maximum delay for outputting audio samples from the audio output devices in the set; determine, based on the maximum delay, timing for outputting audio samples from the audio output devices in the set; and communicate the determined timing to the set of audio output devices for outputting audio samples streamed by the audio source in accordance with the timing.

In an aspect, the maximum delay comprises a maximum time taken for an audio sample from the time the audio sample is output by the audio source to the time the audio sample is output by an audio transducer of an output device from the set.

In an aspect, the timing for outputting the audio samples comprises a time, with reference to a reference clock, to output an audio sample from the output devices, wherein all output devices are time synchronized.

In an aspect, the distribution latency to an audio output device from the set is a function of a communication technology used for communication with the audio output device.

DETAILED DESCRIPTION

Audio output devices such as audio speakers are available in several hardware configurations and can use a range of technologies for processing and rendering audio streams and for communicating with other devices including audio input devices and other audio speakers. Example speakers include Bluetooth® speakers, WiFi™ speakers, Audio for Video speakers (e.g., sound bars) and speakers that use other communication protocols. The wide array of speaker architectures, configurable speaker network topologies and communication technologies (e.g., Bluetooth, Wi-Fi etc.) used by the speakers to communicate with other devices makes interoperation and synchronization between speaker devices complicated and difficult to coordinate and execute.

In certain aspects, complexities arising from the wide differences between the designs of audio output devices making interoperation of audio output devices challenging include, but are not limited to, product to product differences in latencies (e.g., audio processing latencies), electrical differences in certain audio for video products in which not all audio streams come through the main processor for synchronization, differences in processing and synchronization mechanisms for different communication protocols (e.g., Bluetooth, Wi-Fi, etc.), and differences in audio redistribution technologies between speakers configured for in-room distribution and out-of-room distribution. Further complexity can be introduced by certain Digital Signal Processing (DSP) algorithms that can require many milliseconds of extra latency to be performed. More complexities can be introduced based on the topology of the speakers in a network of speakers. For example, different speakers can have different audio distribution latencies as a function of their distances from an audio source device.

Certain aspects of the present disclosure discuss techniques for synchronized audio output from multiple audio output devices while accommodating for the variety of differences in speaker products in a consistent, well-organized and extensible manner.

Figure 1:
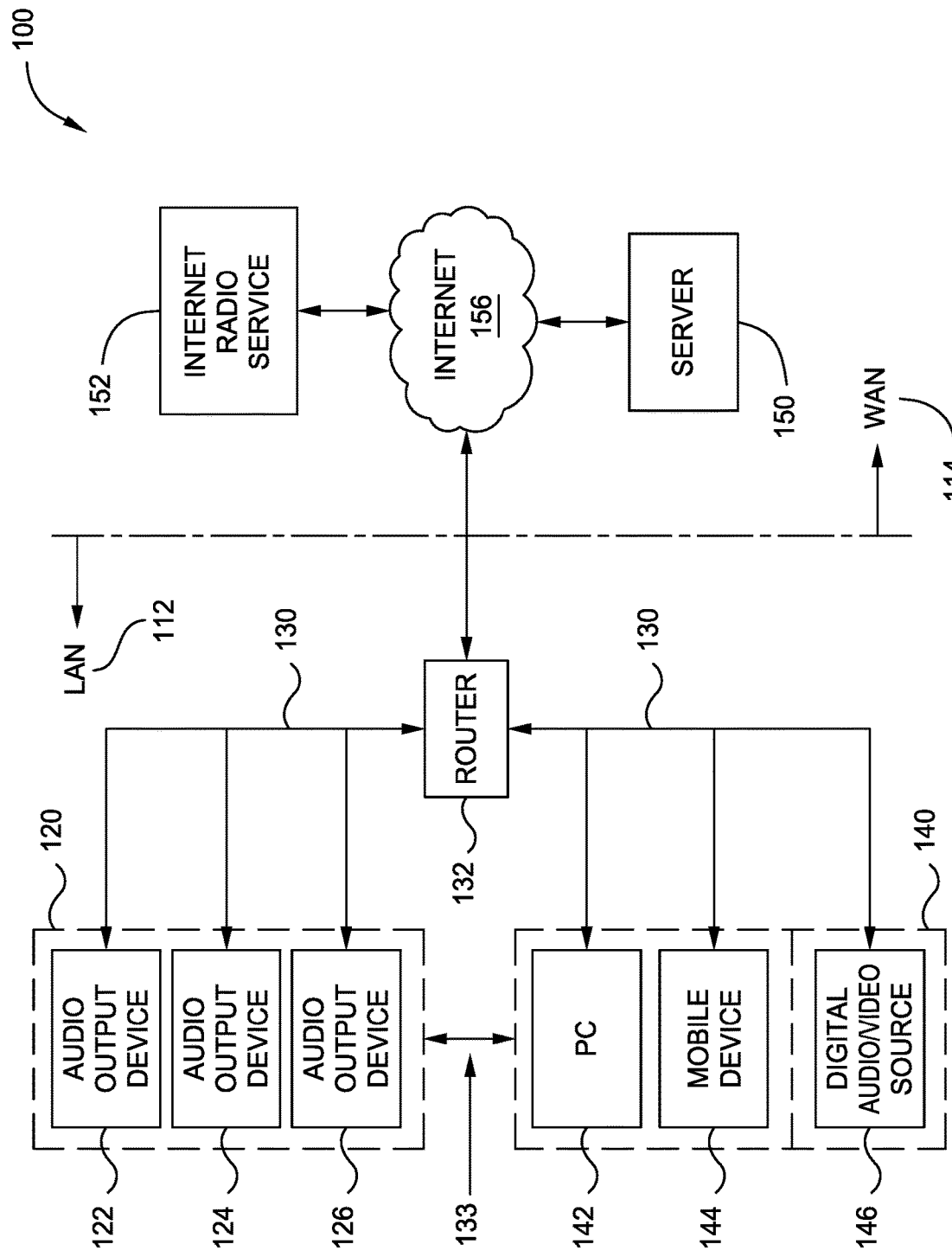
FIG. 1 illustrates an example audio distribution system in which aspects of the present disclosure can be practiced.

FIG. 1 illustrates an example audio distribution system 100 in which aspects of the present disclosure can be practiced.

Audio distribution system 100 can be used to accomplish audio synchronization between audio output devices, and includes non-limiting examples of wireless speaker packages and other wireless audio sources and sinks that can be involved in this audio synchronization. In an aspect, system 100 is adapted to deliver digital audio (e.g., digital music). As shown, system 100 includes a number of audio output devices 122, 124 and 126 which are among a group of audio output devices 120 of the system 100. In an aspect, each of the audio output devices is a wireless speaker package that is able to receive digital audio signals and convert them to analog form. The speaker packages also include an electroacoustic transducer that receives the analog audio signals and transduces them into sound. The wireless speaker packages also include at least one processor for processing audio data. The group of audio output devices 120 can include speaker packages with different hardware architectures and audio configurations. Further, different speaker packages can support different wired and/or wireless communication technologies (e.g., Bluetooth, Wi-Fi, Apple Airplay®, Apple Airplay® 2 a proprietary protocol stack/suite developed by Apple Inc., with headquarters in Cupertino, Calif., that allows wireless streaming of audio, video, and photos, together with related metadata between devices, etc.) to wirelessly communicate with other speaker packages in the group as well as other devices in the system 100. In an aspect, one or more of the speaker packages can support multiple wired and/or wireless communication technologies and can be configured (e.g., by a user) to communicate using one of the supported communication technologies at one time.

System 100 further includes one or more computing devices 140 and/or one or more separate local digital audio/ video source devices 146. In this example the computing devices include a personal computer 142 and a mobile computing device 144 such as a smartphone, tablet or the like. In an aspect, the computing devices 140 and the digital audio video devices 146, like the audio output devices, can support different wired and wireless communication technologies (e.g., Bluetooth, Wi-Fi, Apple Airplay®, Apple Airplay® 2, etc.) for communicating with other devices in the system 100. In an aspect, each of the computing devices 140 and the digital audio/video source devices 146 can support multiple wired and/or wireless communication technologies.

In an aspect, each device in the system 100 that is capable of Wi-Fi communication can be connected to a network 130 via a router/access point 132 and can communicate with other Wi-Fi enabled devices in the system 100 over the network 130 via the router/access point 132. In this example, as shown the audio output devices from group 120, the computing devices 140 and the digital audio/video source devices 146 are connected to the network 130 via the router/access point 132. In this example, the network 130 is part of a wireless Local Area Network (WLAN) 112 which is connected to a wide area network (WAN) 114 by connection to Internet 156. WAN 114 includes a server 150 and an Internet radio service 152 which can both communicate with LAN 112 via the Internet 156.

In certain aspects, one or more of the computing devices 140 and the digital audio/video source device 146 can be connected to one or more of audio output devices 120 via a personal area network (PAN) 133 (e.g., a wireless PAN). PAN 133 can comprise a direct point-to-point wireless connection (e.g., using Bluetooth, Apple Airplay®, Apple Airplay® 2, or other point to point protocol) between the devices 140/146 and one or more of the audio output devices 122, 124 or 126.

In an aspect, the sources of digital audio including the computing devices 140 and the digital audio/video source device 146 provide access to content such as audio streams that are communicated over network 130 and/or network 133 to the audio output devices. The sources of such audio streams can include, for example, Internet radio stations sourced by an internet radio service such as internet radio service 152 and user defined playlists. Each of such digital audio sources maintains a repository of audio content which can be chosen by the user to be played over one or more of the audio output devices. Such digital audio sources can include Internet-based music services such as Pandora®, Spotify® and TuneIn®, for example. The digital audio/video source device 146 can include a network attached storage device. Media server applications running on the PC 142 and the mobile computing device 144 can be used to access digital content over the internet and source audio data for outputting by one or more audio output devices. Typically, the user selects the audio source and the audio output devices via PC 142 and/or mobile device 144.

Figure 2:
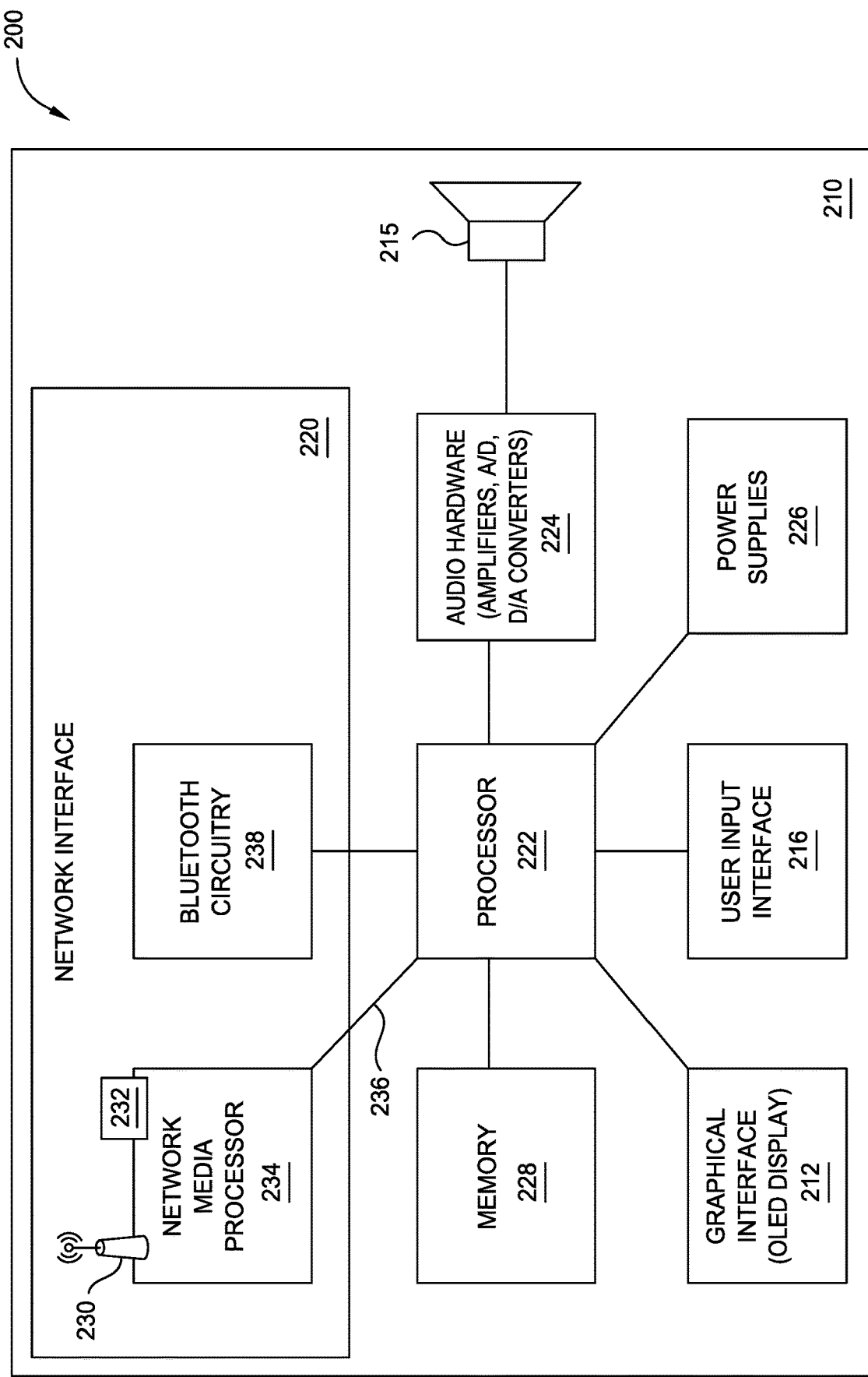
FIG. 2 illustrates an exemplary wireless speaker package, in accordance with certain aspects of the present disclosure.

FIG. 2 illustrates an exemplary wireless speaker package 200, in accordance with certain aspects of the present disclosure. As shown, the wireless speaker package 200 includes an enclosure 210. In the enclosure 210 resides an optional graphical interface 212 (e.g., an OLED display) which can provide the user with information regarding currently playing ("Now Playing") music. The speaker package 200 includes one or more electro-acoustic transducers 215 for outputting audio. Wireless speaker package device 200 also includes a user input interface 216. The user input interface 216 can include a plurality of preset indicators, which can be hardware buttons. The preset indicators can provide the user with easy, one press access to entities assigned to those buttons. The assigned entities can be associated with different ones of the digital audio sources such that a single wireless speaker package 200 can provide for single press access to various different digital audio sources.

Wireless speaker package 200 also includes a network interface 220, at least one processor 222, audio hardware 224, power supplies 226 for powering the various components of the speaker package 200, and memory 228. In an aspect, the processor 222, the graphical interface 212, the network interface 220, the audio hardware 224, the power supplies 226, and the memory 228 are interconnected using various buses, and several of the components can be mounted on a common motherboard or in other manners as appropriate.

The network interface 220 provides for communication between the wireless speaker package 200 and one or more audio sources and other networked wireless speaker packages and other audio playback devices via one or more communications protocols. The network interface 220 can provide either or both of a wireless interface 230 and a wired interface 232. The wireless interface 230 allows the wireless speaker package 200 to communicate wirelessly with other devices in accordance with a communication protocol such as IEEE 802.11. The wired interface 232 provides network interface functions via a wired (e.g., Ethernet) connection.

In certain aspects, the network interface 220 can also include a network media processor 234 for supporting Apple AirPlay® and/or Apple Airplay® 2. For example, if a user connects an AirPlay® or Airplay® 2 enabled device, such as an iPhone or iPad device, to the network, the user can then stream music to the network connected audio playback devices via Apple AirPlay® or Apple Airplay® 2. Notably, the audio playback device can support audio-streaming via AirPlay®, Airplay® 2 and/or DLNA's UPnP protocols, and all integrated within one device.

All other digital audio received as part of network packets comes straight from the network media processor 234 through a USB bridge 236 to the processor 222 and runs into the decoders, DSP, and eventually is played back (rendered) via the electro-acoustic transducer(s) 215.

The network interface 220 can also include a Bluetooth circuitry 238 for Bluetooth applications (e.g., for wireless communication with a Bluetooth enabled audio source such as a smartphone or tablet) or other Bluetooth enabled speaker packages.

Streamed data passes from the network interface 220 to the processor 222. The processor 222 can execute instructions within the wireless speaker package (e.g., for performing, among other things, digital signal processing, decoding, and equalization functions), including instructions stored in the memory 228. The processor 222 can be implemented as a chipset of chips that includes separate and multiple analog and digital processors. The processor 222 can provide, for example, for coordination of other components of the audio speaker package 200, such as control of user interfaces, applications run by the audio playback device 200 and the like.

The processor 222 provides a processed digital audio signal to the audio hardware 224 which includes one or more digital-to-analog (D/A) converters for converting the digital audio signal to an analog audio signal. The audio hardware 224 also includes one or more amplifiers which provide amplified analog audio signals to the electroacoustic transducer(s) 215 for sound output. In addition, the audio hardware 224 can include circuitry for processing analog input signals to provide digital audio signals for sharing with other devices, for example, other speaker packages for synchronized output of the digital audio.

The memory 228 can include, for example, flash memory and/or non-volatile random access memory (NVRAM). In some implementations, instructions (e.g., software) are stored in an information carrier. The instructions, when executed by one or more processing devices (e.g., the processor 222), perform one or more processes, such as those described elsewhere herein. The instructions can also be stored by one or more storage devices, such as one or more computer or machine-readable mediums (for example, the memory 228, or memory on the processor). The instructions can include instructions for performing decoding (i.e., the software modules include the audio codecs for decoding the digital audio streams), as well as digital signal processing and equalization.

It can be appreciated from FIGS. 1 and 2, several complexities can arise as a result of the wide array of speaker architectures, configurable speaker network topologies and communication technologies (e.g., Bluetooth, Wi-Fi, etc.) used by the speakers to communicate with other devices making interoperation and synchronization between speaker devices complicated and difficult to coordinate and execute.

As noted above, aspects of the present disclosure discuss techniques for synchronized audio output from multiple audio output devices while accommodating for the variety of differences in speaker products in a consistent, well organized and extensible manner.

The discussed aspects can be categorized into two major aspects including latency reporting/aggregation and latency actuation. Aspects discussing latency reporting/aggregation discuss techniques for collection and reporting of latencies by various devices in an audio system (e.g., system 100 of FIG. 1), and aggregation of the reported latencies at an audio source device (e.g., a master device). Aspects discussing latency actuation discuss techniques for changing a latency of the system or devices therein, for example, depending on the technologies in use for a given speaker grouping or use-case (e.g., Bluetooth streams, Wi-Fi streams, audio for video lip-sync streams, etc.)

Other discussed aspects include use-case adjustments including network topology or audio source use case changes that result in an adjustment in latency. For example, as discussed later, addition of secondary speakers or change of source from HDMI to Network/Spotify sources can result in a change in the overall maximum latency of the system.

Figure 3:
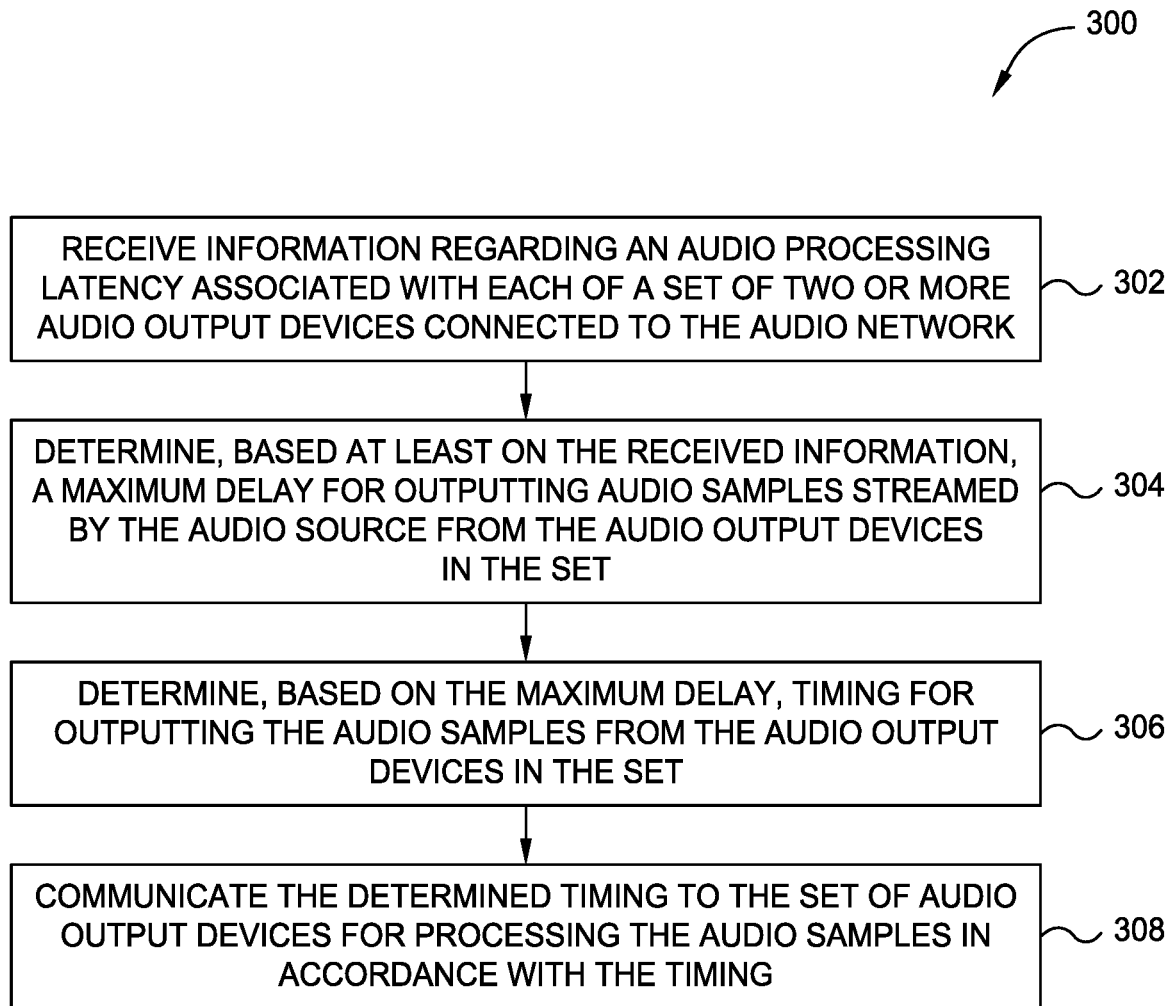
FIG. 3 illustrates example operations that can be performed by an audio source device for negotiating latency in an audio network, in accordance with certain aspects of the present disclosure.

FIG. 3 illustrates example operations 300 that can be performed by an audio source device for negotiating latency in an audio network, in accordance with certain aspects of the present disclosure. In an aspect, the audio source device includes any device in an audio distribution system (e.g., system 100 in FIG. 1) that distributes an audio stream to other devices in the system. In an aspect, the audio source device includes a master speaker package configured to receive an audio stream from an audio input device (e.g., PC, mobile device, digital audio source etc.) and distribute the audio stream to other speaker packages in a configured group of speaker packages.

Operations 300 begin, at 302, by receiving information regarding an audio processing latency associated with each of a set of two or more audio output devices connected to the audio network. In an aspect, the audio network can include a network of audio output and audio input devices as shown in FIG. 1 configured for interoperation. At 304, based at least on the received information, the audio source device determines a maximum delay for outputting audio samples streamed by the audio source device from the audio output devices in the set. At 306, based on the determined maximum delay, the audio source device determines timing for outputting the audio samples from the audio output devices in the set. In an aspect, the timing includes a time, with reference to a clock, at which one or more samples of the audio stream must be output by one or more audio output devices in the set. At 308, the audio source device communicates the determined timing to the set of audio output devices for processing the audio samples in accordance with the timing.

In certain aspects, synchronized playback of an audio stream by two or more speaker packages can be accomplished using a master-slave architecture in which one speaker package serves as a master and receives and distributes to the other speaker packages a stream of audio data.

Figure 4:
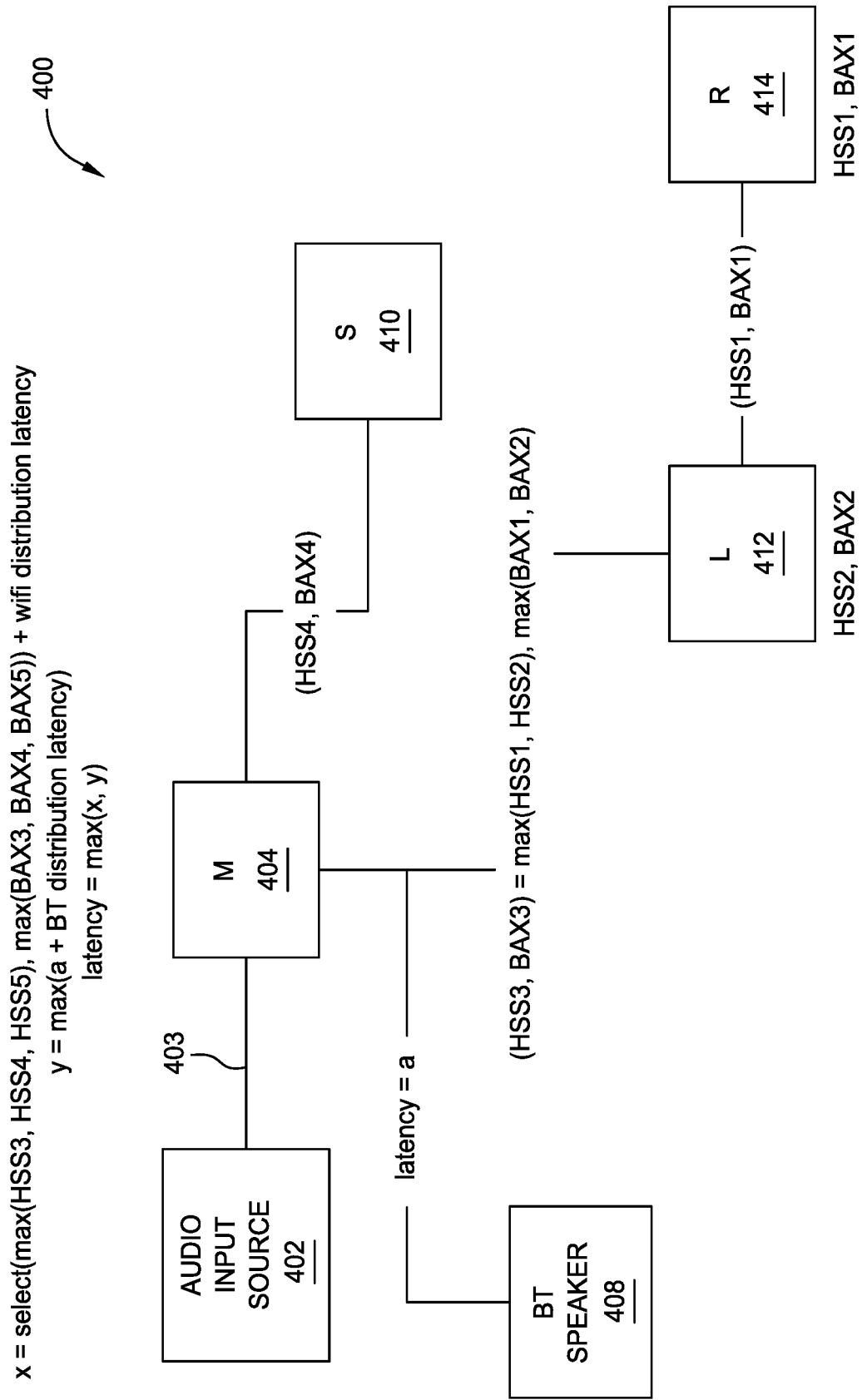
FIG. 4 illustrates an example master-slave audio system of audio output devices in which aspects of the present disclosure can be practiced.

FIG. 4 illustrates an example master-slave audio system 400 of audio output devices in which aspects of the present disclosure can be practiced. In an aspect, the audio system 400 can be a portion of the audio distribution system 100 discussed in FIG. 1.

In certain aspects, Audio system 400 can be used for synchronized output of an audio stream from multiple audio output devices of the system 400. As shown, audio system 400 includes an audio input source 402 that communicates with wireless speaker package 404 over a connection 403. In an aspect, the connection 103 can be a wireless Bluetooth or Wi-Fi connection, or can use any other wired or wireless communication network protocol now known or hereafter developed. System 400 includes one or more additional wireless speaker packages, which in this example implementation includes four additional wireless speaker packages 408, 410, 412 and 414. Normally but not necessarily, in the case where there are multiple wireless speaker packages that are part of the system 400, one wireless speaker package (wireless speaker package 404 in this case) functions as the master device (designated as M in FIG. 4) and the other wireless speaker packages (408, 410, 412 and 414 in this case) function as slave wireless speaker packages. Master device 404 receives audio data from source 402 and distributes it to slaves 408, 410, 412 and 414. In certain aspects, such audio distribution can use any wired or wireless network protocol such as Wi-Fi via wireless access point/router 132 (as shown in FIG. 1) or point to point Bluetooth protocol. In this example implementation, each of the wireless speaker packages 404, 408, 410, 412 and 414 is configured to play the audio. However, in some situations, one or more of the wireless speaker packages have the hardware capability to play the audio but require a software update to be configured to play the audio. In an aspect, the audio playback among the speaker packages can be (but need not be) synchronized such that they all play the same audio at the same time. In an aspect, one or more of the speaker packages can play the audio stream at a purposeful or selected (e.g., via user configuration) phase difference compared to one or more other speaker packages.

In this example, as shown in FIG. 4, the slave speaker packages include a secondary speaker package 410 (designated by S), a left-right speaker pair including a left speaker 412 (designated by L) and a right speaker 414 (designated by R), and a Bluetooth (BT) speaker 408. In an aspect, the right speaker 414 is secondary to the left speaker 412 in the left-right speaker pair, such that the right speaker 414 is controlled by the left speaker 412. In this example, the slave speakers 410, 412 and 414 communicate with the master speaker via Wi-Fi technology while the BT speaker 408 communicates with the master speaker 404 using Bluetooth technology. Note that such connections could operate using one or more other wireless protocols or technologies, and in some implementations, one or more speakers directly or indirectly connected to master 404 include a wired connection to at least one other speaker in the system 400.

In an example configuration, the master speaker package 404 includes a sound bar device receiving an audio stream from an audio source and outputting audio that lip-syncs with video played on a video output device (not shown). In such an example configuration, the secondary speaker 410 could include a surround speaker and/or a bass speaker in the same room as the master speaker 404, such as for a surround sound system. Further, in such an example configuration, the BT speaker 408 could include a pair of Bluetooth headphones that connect to the master speaker and enable a user to listen to the audio stream at a different volume. Further, in such an example configuration, the left-right speaker pair 412 and 414 could be out-of-room speakers placed, for example, in another room or in an outdoor area of a house.

The slave devices 408, 410, 412 and 414 can be synched to the master 404 using a clock synchronization algorithm that keeps the current clock time on all of the slave devices synchronized with that of the master device 404. The devices all have clocks that are synched to a common reference clock. In an aspect, the clock synchronization algorithm is separate and aside from the audio stream. For example, in an implementation, master 404 manages the audio stream, whereas another speaker (such as 412) manages the clock synchronization algorithm. Clock data related to the clock synchronization algorithm can be provided by the master to the slaves periodically (e.g., every few seconds) to keep the slave devices updated and in sync with the master.

In certain aspects as part of latency reporting and aggregation, each of the slave speakers 408, 410, 412 and 414 report to the master speaker 404 their respective latencies related to processing of audio samples. In an aspect, the audio processing latency associated with a particular speaker device can include delays associated with processing a received audio stream including delays associated with internal algorithms, buffers, logical links, user defined delays, and other hardware and software delays associated with processing audio data. In an aspect, a latency value reported by a particular speaker package includes a time taken from when an audio sample is presented to the speaker package to the time the audio sample is output by the speaker package as sound.

In an aspect, each of the Wi-Fi connected slave speaker packages 410, 412 and 414 can be configured either for a lowest latency audio output or a best audio experience audio output. When configured for the lowest latency audio output, the speaker processes a received audio stream so as to incur the least possible delay to output audio having acceptable audio quality. When configured for the best audio experience output, the speaker can trade time for audio quality (e.g., by buffering and or performing additional signal processing to the audio) to provide the best possible audio experience to the user. In an aspect, each slave speaker package 408, 410, 412 and 414 reports two latency values, one value for the lowest latency audio output (designated as HSS) and another value for the best audio experience audio output (designated as BAX).

In the example system 400, as the right speaker 414 is secondary to the left speaker 412, the right speaker 414 reports its latency values (HSS1 and BAX1) to the left speaker 412. The left speaker 412 aggregates the latency values received from the right speaker 414 with its own latency values (HSS2 and BAX2) to be reported to the master speaker 404. In an aspect, the left speaker 412 determines a maximum of the right speaker's latencies and its own latency values, and reports the maximum of the two latency values (HSS3 and BAX3) to the master speaker 404. Similarly, the secondary speaker 410 reports its lowest latency and best audio experience latency values (designated as HSS4 and BAX4) to the master speaker 404. Additionally, the BT speaker 408 reports its internal latency (designated as 'a') to the master speaker 404.

In certain aspects, the master speaker receives latency values from each of the slave speakers 408, 410 and 412, wherein the latency values received from speaker 412 includes a maximum of the latencies of speakers 412 and 414. The master speaker aggregates or compiles the received latencies with its own latency values (designated as HSS5 and BAX5), and determines a maximum latency or delay of all the latency values. Additionally, the master speaker 404 obtains the Wi-Fi distribution latency and Bluetooth latency for distribution audio data to the Wi-Fi speakers 410, 412 and 414 and the BT speaker 408, respectively. Based on the individual latencies of the slave speakers and the master's own latency, and taking into account the respective distribution latencies of each of the slave speakers, the master speaker calculates a maximum delay, which represents a maximum time taken to output an audio stream from any one of the speakers including the master and slave speakers.

Figure 5:
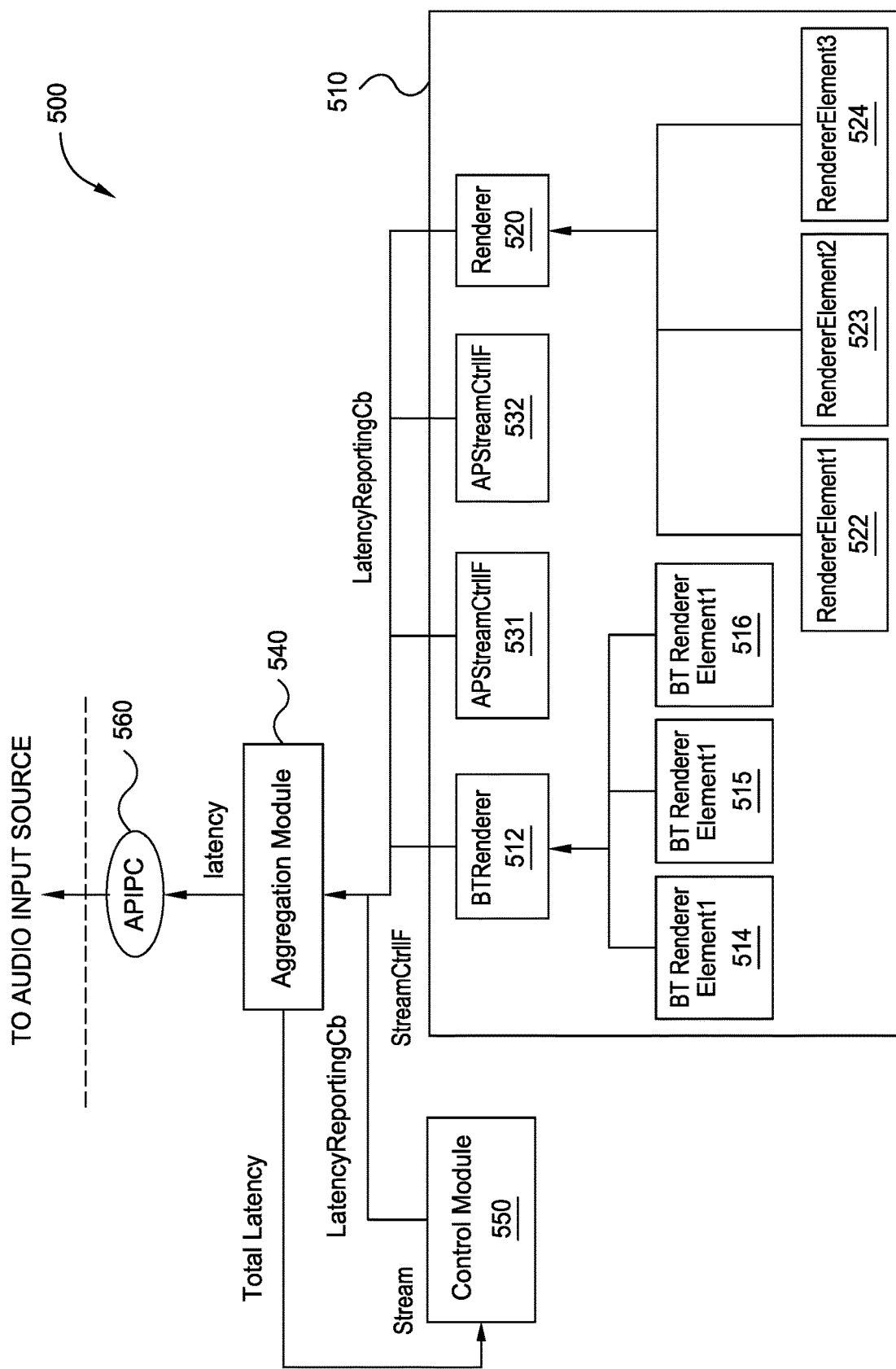
FIG. 5 illustrates an example representation of latency aggregation at an audio source device (e.g., master speaker package), in accordance with certain aspects of the present disclosure.

FIG. 5 illustrates an example representation 500 of latency aggregation at an audio source device (e.g., master speaker package 404), in accordance with certain aspects of the present disclosure. In an aspect, the example representation 500 includes a software module representation of latency aggregation at a master device, such as master speaker 404.

The module 510 represents latencies reported by each entity of an audio distribution system (e.g., audio system 100 of FIG. 1). In an aspect, each entity of the audio distribution system is represented as an element in the latency aggregation module 510. For example, with reference to the system 400, renderer elements 1, 2 and 3 (represented as 522, 523, and 524, respectively) represent latencies of the master speaker 404, secondary speaker 410 and left speaker 412, respectively. The renderer element 3 represents the max of the latencies of the left speaker 412 and right speaker 414. The renderer element 520 represents aggregation of latencies from the master speaker 404, the secondary speaker 410, the left speaker 412 and the right speaker 414. Each of the BT renderer elements 1, 2 and 3 (represented as 514, 515 and 516, respectively) represent latencies of any Bluetooth devices connected to the master. For example, with reference to system 400 of FIG. 4, one of the BT renderer elements 1, 2 or 3 can represent latency of the BT speaker 408. The BT renderer element 512 represents aggregation of latencies from various BT output devices of the audio distribution system. In an aspect, each element corresponding to a particular system entity also represents distribution latency to the particular system entity. The elements 531 and 532 represent any additional latencies associated with the distribution of audio in the audio distribution system. Although three elements are shown for each of the renderer elements (i.e., 522, 523, 524) and BT renderer elements (i.e., 514, 515, 516), any number of renderer elements could be present in module 510, and the number of renderer elements in some implementations is dictated by the number of speaker devices in the system.

The aggregation module 540 represents aggregation and calculation of a maximum delay/latency for distribution of audio data in the audio distribution system (e.g., representing the longest audio path), based on the individual latencies of each audio output device in the system. The control module 550 maintains information relating to audio streams and speaker states, and manages the audio streams based on the determined maximum latencies for the audio distribution system. Additionally, in an aspect, the aggregation module 540 reports the determined maximum latency to the audio input device providing the audio stream. The method of synchronization back to the audio input device (e.g. HDMI, Bluetooth, Airplay®, Apple Airplay® 2, etc.) can utilize the techniques discussed herein to ensure that these latency values are reported in terms that allow the source input device to predict the latency before the input device begins to stream audio, since these numbers are designated to be static given a set of products and a distribution topology.

In certain aspects, latency actuation generally includes determining timing for output of an audio stream from each of a set of audio output devices, based on the determined maximum latency of the audio distribution system. There can be various considerations for determining how the latency actuation is implemented in the audio distribution system. In an aspect, a master device can implement latency actuation based on multiple considerations.

In an aspect, one such consideration is the nature of the input audio stream to be played by the system. In an aspect there are three different types of input audio streams that dictate how latency actuation is implemented in the audio distribution system.

A first type of input audio streams includes streams with a presentation time that have no reliable means to report the delay (e.g., determined maximum delay in the system) back to the input source device streaming the audio data. Examples of such streams include SPDIF, AUX, and ARC audio streams, and more generally, audio streams provided by a wired connection (as opposed to a wireless connection). In these examples, there is no way for a master device controlling the latency actuation to ask the source input device to delay their video to match the audio being played by the audio output devices in the system. Thus, these type of streams require the use of a lowest latency path for audio output.

A second type of input audio streams includes streams with a presentation time that have a means to report the delay back to the input source device streaming the audio data. Examples of such streams include Bluetooth and Apple Airplay® 2 streams. These delay reports allow the master device to utilize longer rendering and data link times while still preserving the user experience in most use cases. In an aspect, these types of streams do not require the use of lowest latency path for audio output and can allow the use of best audio experience output by allowing the extra time needed for such an experience.

A third type of input audio streams includes streams without a presentation time. Examples of such streams include audio streamed over the internet that does not have a reference time for a given audio frame. These streams can be pre-buffered to prevent underflow and increase robustness. Since there is no reference time for a given frame, time to audio can be traded for audio quality and data link robustness. Thus, these types of streams allow the use of best audio experience by allowing the extra time for buffering the audio steam.

Another consideration for determining how the latency actuation is implemented in the audio distribution system is the role of a speaker. In an aspect, a speaker can be configured for in-room operation or out-of-room operation.

In an aspect, for speakers configured as in-room speakers, the phase of the audio output from the transducers of the in-room speakers is always matched. For example, connected Bluetooth headphones (e.g., BT speaker 408 in FIG. 4) can be considered in-room speakers and therefore the phase of audio output from Bluetooth headphones is always matched with audio output from other speakers also configured for in-room operation. An example use case for this is when a user watching TV wants to listen to the TV audio at a different volume using Bluetooth headphones. In this case, the phase of audio output from the Bluetooth headphones needs to match other speakers in the room playing the same TV audio to avoid confusion (e.g., as the user can still feel the sound in the room, in most situations). In such an example implementation, master speaker 404 could include, or merely be, a soundbar device connected to a television or display, such that the soundbar is configured to output audio based on video output by the television or display.

In an aspect, for speakers configured as out-of-room speakers, the phase synchronization can be relaxed so that the phase of audio output from the out-of-room speakers does not match with in-room speakers playing the same audio content. Thus, in an aspect, for out-of-room speakers connected to the master over Bluetooth or Wi-Fi, the user can be given a choice to hear the audio stream at an intentional phase difference with in-room speakers allowing for a best audio experience (instead of using the lowest latency path for phase match with other in-room speakers). This can specifically be helpful for streams that have a reference time for a given audio frame and no way of reporting delay back to the source input device. An example use case for this scenario can include a user listening to the audio of a football game on out-of-room speakers in an outdoor patio area of the user's house away from a TV installed in one of the rooms in the house that is playing video of the football game. In this case, even if the audio output from the out-of-room speakers is not perfectly synchronized to the speakers in the same room as the TV is, the user may not notice it, and in fact, can choose to have the out-of-sync output in favor of better audio experience.

In certain aspects, such phase matching can be managed automatically by the system or manually based on user input, or a combination of the two (e.g., default to an automatic setting, but allow a user to configure one or more related options). In addition, in certain aspects, the phase-match determination could be set for a speaker no matter how that speaker is grouped to other speakers in the system, or the phase-match determination could be set at each instance of speaker grouping in the system. In an example implementation, a user can choose whether to sync the master's audio with video (e.g., to bring it out of sync with other rooms), or sync the master with other speakers (e.g., to break lip sync with video). Such a selection can be useful for soundbar devices, for example, as they can connect the system (e.g., system 400) to access audio for video (e.g., via a connection to a television). Further, such a selection could be made from an app that allows the user to manually change the phase match setting.

In certain aspects, speakers of the audio distribution system can be configured as in-room or out-of-room by a user using an application interface installed on the user's phone or computer, or by selecting a special purpose button on a speaker. In an aspect, each speaker can inform the master upon power up whether the speaker is configured as an in-room speaker or an out-of-room speaker. In an aspect, certain aspects, by default, are configured as in-room or out-of-room. For example, Bluetooth headphones can be configured as in-room by default. Similarly, weather proof or outdoor speakers can be configured as out-of-room by default.

In certain aspects, as part of the latency actuation, the master device determines a "play at time" based on the maximum latency of the audio distribution system determined by the master device. In an aspect, the "play at time" represents the time, with reference to a synchronized reference clock, each audio output device in the group chosen to play the audio stream outputs a first sample of a particular audio stream. For example, each audio stream can represent a different audio track. In an aspect, the "play at time" is communicated in control data that is separate from the audio stream and is only sent once for each track (i.e., it is not included with every frame). Every new track or stream will get a new "play at time". Since the "play at time" takes into account the longest latency, it ensures that all speaker transducers can output the audio output in a synchronized manner. As noted above, each device in the audio distribution system is synchronized to the reference clock.

In certain aspects, the master device can communicate the audio packets to each slave speaker as soon as it is available to the master. However, each speaker can have a different processing/rendering latency and may need to take appropriate measures to ensure that the first sample is played at the "play at time" received from the master device. In an aspect, each slave speaker based on its own latency determines how much earlier it needs to start processing the stream so that it starts outputting the stream at the "play at time". For example, if the speaker's local delay is 100 milliseconds (ms), it starts processing the first sample 100 ms before the play at time even if starts receiving the audio stream earlier than 100 ms before the "play at time". In an aspect, if a speaker starts receiving the audio stream earlier than it should start processing to meet the "play at time", the speaker starts buffering the audio stream in a local buffer and extracts the audio data from the buffer when it is ready to process the audio stream.

In certain aspects, if a speaker decides that it needs more time and cannot play the first sample of the audio stream at the "play at time" (e.g., the speaker receives the packet including the "play at time" information later due to communication delay), it can start playing/outputting samples from a later sample to match phase with other speakers. That is, if the speaker misses the time instant for outputting the first sample, it starts playing from an earliest later sample that it can for synchronized output with other speakers and discards the samples that it could not play. In an aspect, the speaker can determine when to output a later sample of the audio stream based on an offset to the "play at time" received as part of the audio stream.

In certain aspects, when the audio source is a Wi-Fi stream (e.g., Spotify stream), because there is no reference time for a given audio frame, time to audio can be traded for audio quality and to achieve robustness. Meaning, the timing and playing of sample 0 can be delayed to accommodate for the longest latency path. For example, if a furthest or most delayed speaker needs an extra 250 ms to output the audio but the master only needs 50 ms, the source and other speakers can hold (e.g., by buffering) the stream for longer to implement the same latency playback for all speakers in the group. For example, the master will transmit packets for a new track to all speakers as soon as it receives the packets and everyone buffers the packets without playing. However, the speakers do not start to play until their rendering latency matches the determined maximum latency for the system. The master tells everyone when to start, e.g., each speaker takes into account its own offset or latency from the "play at time". In an aspect, the audio stream can be buffered at the audio source and the "play at time" for sample 0 can be pushed to a later time for the best audio experience.

In certain aspects, in the context of audio-for-video devices where the speakers lip sync to a video being played on a video output device, the master device can report the determined longest delay of the audio distribution to the audio/video input device. In an aspect, based on the received longest delay, the audio/video input device can delay the video stream in order to match with the audio played by the speakers.

In certain aspects, use-case adjustments include adjusting the timing (e.g., play at time) of the system based on changes in network topology or other audio source use case changes. Generally, latency values for a given device are static per build of the device. However, the redistribution modes or topologies chosen for a group of devices by the customer can change. Thus, the system latencies (e.g., longest latency) need to be calculated every time there is a change in the topology of the audio distribution system. Examples of system topology changes include adding Wi-Fi out-of-room speakers to a grouping, adding a Bluetooth out-loud speaker, adding a Bluetooth headphone, adding accessory speakers, and adding speakers to a left-right group, to provide some examples. In an aspect, each of these events can result in a change in the longest latency of the system, and thus, the latency needs to be re-determined (e.g., using method 300).

In certain aspects, a master device, upon detecting a change in the topology of the audio distribution system, re-initiates the latency reporting and aggregation as discussed in accordance with aspects of the present disclosure, and re-calculates the longest system latency and the "play at time" for the changed topology. In an aspect, care is taken to only accept a new overall play-at-time depending on the type of topology change. For example, if a latency has changed due to a new speaker being added, and if the current stream is a WiFi stream (e.g. Spotify), the currently playing groups' audio playback is not interrupted. On the other hand when rendering a stream that requires a fixed latency with sufficient robustness, the software can choose to alter the "play at time", which induces a short-lived audio mute and resume at the new offset. If the master device decides to alter the "play at time", it further communicates the new adjusted "play at time" to the slave devices to be used in synchronized out of an audio stream.

In certain aspects, if a speaker responsible for the longest delay is dropped, there can be a benefit in re-calculating the longest latency and possibly switching to a lower longest latency, especially for audio for video lip sync purposes.

It may be noted that, descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware embodiment, an entirely software embodiment (including firmware, resident software, micro-code, etc.) or an embodiment combining software and hardware aspects that can all generally be referred to herein as a "component," "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium can be any tangible medium that can contain or store a program.

The flowchart and block diagrams in the Figures illustrate the architecture, functionality and operation of possible implementations of systems, methods and computer program products according to various aspects. In this regard, each block in the flowchart or block diagrams can represent a module, segment or portion of code, which comprises one or more executable instructions for implementing the specified logical function(s). In some alternative implementations the functions noted in the block can occur out of the order noted in the figures. For example, two blocks shown in succession can, in fact, be executed substantially concurrently, or the blocks can sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions. In an example implementation, such a special-purpose hardware-based system includes an audio device that includes one or more transducers.

What is claimed is:

1. A method of negotiating latency for a plurality of audio output devices, the method comprising:
   receiving information regarding an audio processing latency associated with each audio output device of a set of two or more audio output devices connected to a network;
   determining, based at least on the received information, a maximum delay for outputting audio from the set of two or more audio output devices, the maximum delay based on a longest audio latency path given a distribution topology of the set of two or more audio output devices;
   determining, based on the maximum delay, timing for outputting the audio from the set of two or more audio output devices; and
   communicating the timing for outputting the audio to the set of two or more audio output devices to assist with synchronizing the audio output by the set of two or more audio output devices.

2. The method of claim 1, wherein the maximum delay includes a maximum time taken for the audio to be received by a given audio output device of the set of two or more audio output devices and then output by at least one audio transducer of the given audio output device.

3. The method of claim 1, the method further comprising, in response to detecting a change in the distribution topology of the set of two or more audio output devices, determining a new maximum delay based on the longest audio latency path given the changed distribution topology of the set of two or more audio output devices.

4. The method of claim 1, wherein the distribution topology is based on the communication technologies used.

5. The method of claim 4, wherein the communication technologies include at least one of wired communication technologies, wireless communication technologies, Bluetooth, Wi-Fi, Apple Airplay®, or Apple Airplay® 2.

6. The method of claim 1, wherein the timing for outputting the audio includes a time, with reference to a reference clock, to output an audio sample from the set of two or more audio output devices.

7. The method of claim 1, further comprising:
   communicating the audio to a first subset of the set of two or more audio output devices using a first communication technology; and
   communicating the audio to a second subset of audio output devices from the set using a second communication technology different from the first communication technology.

8. The method of claim 7, wherein the first and second communication technologies are wireless communication technologies.

9. The method of claim 1, further comprising:
   obtaining information regarding whether a given audio output device from the set of two or more audio output devices is configured for in-room operation or out-of-room operation.

10. The method of claim 9, further comprising:
    determining, based on the obtained information, that the given audio output device is configured for out-of-room operation, such that the given audio output device is configured to output the audio with a phase shift from the audio output by one or more other audio output devices from the set of two or more audio output devices.

11. The method of claim 1, further comprising:
    detecting a change in configuration of the network;
    determining, based on the change in the configuration of the network, an adjusted timing for outputting the audio from the set of two or more audio output devices; and
    communicating the adjusted timing to the audio output devices.

12. The method of claim 1, further comprising:
    communicating at least an indication of the timing to a video output device, the video output device configured to output video synchronized with the audio,
    wherein the indication of the timing is configured to assist with synchronizing video output by the video output device with the audio.

13. An audio output device comprising:
    at least one audio transducer;
    at least one processor;
    memory including instructions executable by the at least one processor, the instructions configured to cause the at least one processor to:
      receive information regarding an audio processing latency associated with one or more other audio output devices, the one or more other audio output devices connected to the audio output device via a network;
      determine, based at least on the received information, a maximum delay for outputting audio from the audio output device and the one or more other audio output devices, the maximum delay based on a longest audio latency path given a distribution topology of the set of two or more audio output devices;

determine, based on the maximum delay, timing for outputting the audio from the audio output device and the one or more other audio output devices; and communicate the timing for outputting the audio to the at least one other audio output device to assist with synchronizing the audio output by the at least one audio transducer of the audio output device with the audio output by the one or more other audio output devices.

14. The audio output device of claim 13, wherein the maximum delay includes a maximum time taken for the audio to be received by a given audio output device of the one or more other audio output devices and then output by at least one audio transducer of the given audio output device.

15. The audio output device of claim 13, wherein the instructions are further configured to cause the at least one processor to, in response to detecting a change in the distribution topology of the set of two or more audio output devices, determine a new maximum delay based on the longest audio latency path given the changed distribution topology of the set of two or more audio output devices.

16. The audio output device of claim 13, wherein the distribution topology is based on the communication technologies used.

17. The audio output device of claim 16, wherein the communication technologies include at least one of wired communication technologies, wireless communication technologies, Bluetooth, Wi-Fi, Apple Airplay®, or Apple Airplay® 2.

18. The audio output device of claim 13, wherein the timing for outputting the audio includes a time, with reference to a reference clock, to output an audio sample from the one or more other audio output devices.

19. The audio output device of claim 13, wherein the instructions are further configured to cause the at least one processor to:

communicate the audio to a first audio output device of the one or more other audio output devices using a first communication technology; and communicate the audio to a second audio output device of the one or more other audio output devices using a second communication technology different from the first communication technology.

20. The audio output device of claim 19, wherein the first and second communication technologies are wireless communication technologies.

* * * * *